US009110617B2

(12) United States Patent
Matsuda et al.

(10) Patent No.: US 9,110,617 B2
(45) Date of Patent: Aug. 18, 2015

(54) COOPERATIVE IMAGE PROCESSING SYSTEM, COOPERATIVE IMAGE PROCESSING METHOD, PORTABLE INFORMATION APPARATUS, IMAGE PROCESSING APPARATUS, AND RECORDING MEDIUM

(71) Applicant: Konica Minolta, Inc., Chiyoda-ku (JP)

(72) Inventors: Hideyuki Matsuda, Hirakata (JP); Takeshi Hibino, Toyokawa (JP); Toshihiko Otake, Ikeda (JP); Toshikazu Kawaguchi, Kobe (JP); Masayuki Kawamoto, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/940,687

(22) Filed: Jul. 12, 2013

(65) Prior Publication Data

US 2014/0022590 A1 Jan. 23, 2014

(30) Foreign Application Priority Data

Jul. 20, 2012 (JP) ................................ 2012-162143

(51) Int. Cl.

*G06F 3/12* (2006.01)
*H04N 1/00* (2006.01)
*H04N 1/32* (2006.01)

(52) U.S. Cl.

CPC .......... *G06F 3/1273* (2013.01); *H04N 1/00222* (2013.01); *H04N 1/00344* (2013.01);

(Continued)

(58) Field of Classification Search

CPC ............. G06F 3/1273; H04N 1/00222; H04N 1/00344; H04N 1/32122; H04N 1/011; H04N 2201/001; H04N 2201/0015; H04N 2201/0094; H04N 2201/3274; H04N 2201/3202

USPC ............. 358/1.1, 1.4, 1.5, 1.6, 1.9, 1.11–1.18

See application file for complete search history.

(56) References Cited

U.S. PATENT DOCUMENTS

2006/0061820 A1 3/2006 Okamoto et al.
2010/0085598 A1 4/2010 Kobayashi et al.

(Continued)

FOREIGN PATENT DOCUMENTS

JP 2003-015855 A 1/2003
JP 2006-094070 A 4/2006

(Continued)

OTHER PUBLICATIONS

Office Action (Notification of Reasons for Refusal) issued on Dec. 2, 2014, by the Japanese Patent Office in corresponding Japanese Patent Application No. 2012-162143 and an English translation of the Office Action. (4 pages).

*Primary Examiner* — Thierry L Pham

(74) *Attorney, Agent, or Firm* — Buchanan Ingersoll & Rooney PC

(57) ABSTRACT

A cooperative image processing system comprises an image processing apparatus and a portable information apparatus; the image processing apparatus comprises: a file creator that creates a file; a transmitter that transmits the file to the portable information apparatus; and a log information generator that generates log information of the image processing apparatus which includes a transmission history; the portable information apparatus comprises: a display; one or more processors; a cooperation portion that shows on the display an operation screen; transmits user instructions entered through the operation screen, to the image processing apparatus; receives the file in exchange for the user instructions; and transfers the file to any one of the one or more processors; a log information obtaining portion that obtains: the log information of the image processing apparatus and that of the portable information apparatus; and a log information manager that consolidates the log information of both of them.

21 Claims, 8 Drawing Sheets

(52) U.S. Cl.
CPC ...... *H04N1/32122* (2013.01); *H04N 2201/001* (2013.01); *H04N 2201/0015* (2013.01); *H04N 2201/0094* (2013.01); *H04N 2201/3202* (2013.01); *H04N 2201/3274* (2013.01)

(56) References Cited

U.S. PATENT DOCUMENTS

2011/0129237 A1 6/2011 Nakagawa
2012/0117113 A1* 5/2012 Fujisawa ........................ 707/771

FOREIGN PATENT DOCUMENTS

JP 2007-166202 A 6/2007
JP 2010-074681 A 4/2010
JP 2010-182194 A 8/2010
JP 2011-119870 A 6/2011
JP 2012-104036 A 5/2012

* cited by examiner

| | Job ID | Time | User name | Title of Document | Destination | Operations at destination | State Information |
|---|---|---|---|---|---|---|---|
| 301 | 1 | 10:00 | – | – | – | – | Now scanning |
| | | 10:01 | – | – | – | – | Successfully finished scanning |
| | | 10:01 | – | – | – | – | Now transmitting |
| | | 10:01 | – | – | – | – | Successfully finished transmitting |
| | | 10:01 | User A | Document001 | Cooperation Application | – | – |

FIG.5

| | Job ID | Time | User name | Title of Document | Destination | Operations at destination | State Information |
|---|---|---|---|---|---|---|---|
| 301 | 1 | 10:00 | – | – | – | – | Now scanning |
| | | 10:01 | – | – | – | – | Successfully finished scanning |
| | | 10:01 | – | – | – | – | Now transmitting |
| | | 10:01 | – | – | – | – | Successfully finished transmitting |
| | | 10:01 | User A | Document001 | Cooperation Application | – | – |
| 302 | | 10:10 | User A | Document001 | General-purpose Application 001 | Download | – |
| | | 10:15 | User A | Document001 | General-purpose Application 001 | Edit | – |
| | | 10:20 | User A | Document001 | General-purpose Application 001 | Email transmission | – |

FIG.6

| | Job ID | Time | User name | Title of Document | Destination | Operations at destination | State Information |
|---|---|---|---|---|---|---|---|
| | 1 | 10:00 | – | – | – | – | Now scanning |
| | | 10:01 | – | – | – | – | Successfully finished scanning |
| 301 | | 10:01 | – | – | – | – | Now transmitting |
| | | 10:01 | – | – | – | – | Successfully finished transmitting |
| | | 10:01 | User A | Document001 | Cooperation Application | – | – |
| | | 10:10 | User A | Document001 | General-purpose Application 001 | Download | – |
| 302 | | 10:15 | User A | Document001 | General-purpose Application 001 | Edit | – |
| | | 10:20 | User A | Document001 | General-purpose Application 001 | Email transmission | – |
| 303 | 2 | 11:00 | User B | Document001 | General-purpose Application 002 | Download | – |
| | | 11:00 | User B | Document001 | General-purpose Application 002 | Printing | – |
| | | 11:11 | – | – | – | – | Now printing |
| 304 | | 11:12 | – | – | – | – | Successfully finished printing |
| | | 11:12 | User B | Document001 | MFP001 | Completion of printing | – |

FIG.8

COOPERATIVE IMAGE PROCESSING SYSTEM, COOPERATIVE IMAGE PROCESSING METHOD, PORTABLE INFORMATION APPARATUS, IMAGE PROCESSING APPARATUS, AND RECORDING MEDIUM

This application claims priority under 35 U.S.C. §119 to Japanese Patent Application No. 2012-162143 filed on Jul. 20, 2012, the entire disclosure of which is incorporated herein by reference in its entirety.

BACKGROUND OF THE INVENTION

1. Field of the Invention

The present invention relates to a cooperative image processing system that includes: an image processing apparatus such as a Multi-Function Peripheral (MFP), i.e., a multifunctional digital machine; a portable information apparatus such as a smartphone or a tablet computer terminal that is capable of physically or wirelessly connecting to the image processing apparatus; a cooperative image processing method for the cooperative image processing system; the portable information apparatus; the image processing apparatus; and a recording medium.

2. Description of the Related Art

The following description sets forth the inventor's knowledge of related art and problems therein and should not be construed as an admission of knowledge in the prior art.

In recent years, users can store digital documents on their portable information apparatuses such as smartphones and tablet computer terminals, and even view and edit the stored documents anytime and anywhere they like. After editing a document by their portable information apparatuses, users can transmit the document to an image processing apparatus such as a MFP to have it printed out by or stored on the image processing apparatus. Users also can create a file consisting of image data, for example, by scanning a physical paper document with a scanner of the image processing apparatus, transmit it to their portable information apparatuses to edit the file thereby.

Meanwhile, in recent years, there is a cooperative image processing system with an image processing apparatus and portable information apparatuses, which allows users to access functions of the image processing apparatus from their portable information apparatuses. In this cooperative image processing system, each portable information apparatus is allowed to display on its display portion, an operation screen that looks identical with that on an operation panel of the image processing apparatus; transmit to the image processing apparatus, operation information indicating the user's operations entered through the operation screen; and receive the operation information therefrom, thus the image processing apparatus is allowed to work the same as if the user operated the original operation screen of the image processing apparatus.

With this cooperative image processing system, users can instruct the image processing apparatus to execute its function, by operating the portable information apparatus as if they operated an original operation screen of the image processing apparatus, i.e.; users can instruct the image processing apparatus and their portable information apparatuses to perform processing on a file cooperatively, simply by operating an operation screen of their portable information apparatuses. Thus this cooperative image processing system achieves smooth cooperation between the image processing apparatus and the portable information apparatus.

By the way, when a user operates the image processing apparatus or his/her portable information apparatus, the image processing apparatus or the portable information apparatus usually generates and stores its log information that is an operation history proving the evidence of the user operations. The image processing apparatus and the portable information apparatus usually create and store their own log information, and so they do even in the cooperative image processing system which makes the image processing apparatus and each portable information apparatus perform processing on a file cooperatively, as described above.

When searching for a certain file that has been subjected to processing by the image processing apparatus and the portable information apparatus cooperatively, users are bothered to examine log information of both the image processing apparatus and the portable information apparatus by operating different screens from the image processing apparatus and the portable information apparatus separately, which is quite troublesome.

Japanese Unexamined Patent Publication No. 2011-119870 discloses a system including image forming apparatuses and an information processing apparatus, the system being characterized by: allowing users to select an image forming apparatus, the state of which they wish to confirm immediately; making the selected image forming apparatus transmit, when there is a change in its state, a file including the state log to an external file server; making the information processing apparatus show a list of all image forming apparatuses in the system on its screen, while adding only to the selected image forming apparatus in the list, a button for showing the state of it; and when the button is pressed, making the information processing apparatus show the state of the selected image forming apparatus on the basis of the state log included in the file originated from the selected image forming apparatus.

However, the technique described in Japanese Unexamined Patent Publication No. 2011-119870 only makes the information processing apparatus control the states of all the image forming apparatuses, not providing a perfect solution to the problem that search for a certain file is never easy in a cooperative image processing system which makes an image processing apparatus and a portable information apparatus perform processing cooperatively on a file.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a cooperative image processing system comprising an image processing apparatus and a portable information apparatus capable of connecting to each other physically or wirelessly, the image processing apparatus comprising:

a file creator that creates a file in accordance with user instructions from the portable information apparatus;

a transmitter that transmits the file created by the file creator, to the portable information apparatus in accordance with user instructions from the portable information apparatus; and a log information generator that generates log information of the image processing apparatus which includes a transmission history proving that the file has been transmitted by the transmitter, the portable information apparatus comprising:

a display;

one or more file processors that perform processing on the file created by the file creator of the image processing apparatus;

a cooperation portion that shows on the display an operation screen through which to use functions of the image processing apparatus; transmits user instructions for creating and transmitting the file, which are entered through the operation screen, to the image processing apparatus; receives the file created by the image processing apparatus, in exchange for the user instructions; and transfers the file to any one of the one or more file processors in response to a request therefrom;

a log information obtaining portion that obtains the log information of the image processing apparatus about the file, which is generated by the log information generator of the image processing apparatus, and log information of the portable information apparatus about the same file; and a log information manager that consolidates the log information of both the image processing apparatus and the portable information apparatus, which is obtained by the log information obtaining portion.

A second aspect of the present invention relates to a cooperative image processing system comprising an image processing apparatus and a portable information apparatus capable of connecting to each other physically or wirelessly, the image processing apparatus comprising:

a job execution portion that executes a job on a file in accordance with user instructions from the portable information apparatus; and a log information generator that generates log information of the image processing apparatus which includes a job history proving that the file has been subjected to job execution by the job execution portion, the portable information apparatus comprising:

a display;

one or more file processors that creates a target file for job execution;

a cooperation portion that shows on the display an operation screen through which to use functions of the image processing apparatus; receives the target file created by the one or more file processors; and transmits the target file to the image processing apparatus along with user instructions for job execution entered through the operation screen;

a log information obtaining portion that obtains: the log information of the image processing apparatus about the file, which is generated by the log information generator of the image processing apparatus; and log information of the portable information apparatus about the same file; and a log information manager that consolidates the log information of both the image processing apparatus and the portable information apparatus, which is obtained by the log information obtaining portion.

A third aspect of the present invention relates to a cooperative image processing method to be implemented by an cooperative image processing system comprising an image processing apparatus and a portable information apparatus capable of connecting to each other physically or wirelessly, the cooperative image processing method comprising:

the following steps of the image processing apparatus:

creating a file in accordance with user instructions from the portable information apparatus;

transmitting the created file to the portable information apparatus in accordance with user instructions from the portable information apparatus; and generating log information of the image processing apparatus which includes a transmission history proving that the file has been transmitted; and the following steps of the portable information apparatus:

performing processing on the created file;

showing on a display an operation screen through which to use functions of the image processing apparatus; transmitting user instructions for creating and transmitting the file, which are entered through the operation screen, to the image processing apparatus; receiving the created file in exchange for the user instructions; and transferring the file in response to a request so that the file can be subjected to processing;

obtaining: the log information of the image processing apparatus about the file, which is generated by the image processing apparatus; and log information of the portable information apparatus about the same file; and consolidating the log information of both the image processing apparatus and the portable information apparatus, which is obtained.

A fourth aspect of the present invention relates to a cooperative image processing method to be implemented by an cooperative image processing system comprising an image processing apparatus and a portable information apparatus capable of connecting to each other physically or wirelessly, the cooperative image processing method comprising:

the following steps of the image processing apparatus:

executing a job on a file in accordance with user instructions from the portable information apparatus; and generating log information of the image processing apparatus which includes a job history proving that the file has been subjected to job execution; and the following steps of the portable information apparatus:

creating a target file for job execution;

showing on a display, an operation screen through which to use functions of the image processing apparatus; receiving the created target file; and transmitting the target file to the image processing apparatus along with user instructions for job execution entered through the operation screen;

obtaining: the log information of the image processing apparatus about the file, which is generated by the image processing apparatus; and log information of the portable information apparatus about the same file; and consolidating the log information of both the image processing apparatus and the portable information apparatus, which is obtained.

A fifth aspect of the present invention relates to an image processing apparatus capable of connecting to a portable information apparatus physically or wirelessly, the image processing apparatus comprising:

a file creator that creates a file in accordance with user instructions from the portable information apparatus;

a transmitter that transmits the file created by the file creator, to the portable information apparatus in accordance with user instructions from the portable information apparatus; and a log information generator that generates log information of the image processing apparatus which includes a transmission history proving that the file has been transmitted by the transmitter, wherein the transmitter transmits the log information generated by the log information generator to the portable information apparatus without waiting for or in response to a request from the portable information apparatus.

A sixth aspect of the present invention relates to an image processing apparatus capable of connecting to a portable information apparatus physically or wirelessly, the image processing apparatus comprising:

a job execution portion that executes a job on a file in accordance with user instructions from the portable information apparatus;

a log information generator that generates log information of the image processing apparatus which includes a job history proving that the file has been subjected to job execution by the job execution portion; and a transmitter that transmits the log information generated by the log information generator to the portable information apparatus without waiting for or in response to a request from the portable information apparatus.

A seventh aspect of the present invention relates to a non-transitory computer-readable recording medium with a cooperation program being stored thereon to make a computer of an image processing apparatus capable of connecting to a portable information apparatus physically or wirelessly, execute the following steps:

creating a file in accordance with user instructions from the portable information apparatus;

transmitting the created file to the portable information apparatus in accordance with user instructions from the portable information apparatus; and generating log information of the image processing apparatus which includes a transmission history proving that the file has been transmitted, wherein the generated log information is transmitted to the portable information apparatus without waiting for or in response to a request from the portable information apparatus.

An eighth aspect of the present invention relates to a non-transitory computer-readable recording medium with a cooperation program being stored thereon to make a computer of an image processing apparatus capable of connecting to a portable information apparatus physically or wirelessly, execute the following steps:

executing a job on a file in accordance with user instructions from the portable information apparatus;

generating log information of the image processing apparatus which includes a job history proving that the file has been subjected to job execution; and transmitting the generated log information to the portable information apparatus without waiting for or in response to a request from the portable information apparatus.

A ninth aspect of the present invention relates to a portable information apparatus capable of connecting to an image processing apparatus physically or wirelessly, the portable information apparatus comprising:

a display;

one or more file processors that perform processing on a file created by the image processing apparatus;

a cooperation portion that shows on the display an operation screen through which to use functions of the image processing apparatus; transmits user instructions for creating and transmitting the file, which are entered through the operation screen, to the image processing apparatus; receives the file created by the image processing apparatus, in exchange for the user instructions; and transfers the file to any one of the one or more file processors in response to a request therefrom;

a log information obtaining portion that obtains: log information of the image processing apparatus which includes a transmission history proving that the file has been transferred; and log information of the portable information apparatus about the same file; and a log information manager that consolidates the log information of both the image processing apparatus and the portable information apparatus, which is obtained by the log information obtaining portion.

A tenth aspect of the present invention relates to a portable information apparatus capable of connecting to an image processing apparatus physically or wirelessly, the portable information apparatus comprising:

a display;

one or more file processors that creates a target file for job execution;

a cooperation portion that shows on the display an operation screen through which to use functions of the image processing apparatus; receives the target file created by the one or more file processors; and transmits the target file to the image processing apparatus along with user instructions for job execution entered through the operation screen;

a log information obtaining portion that obtains: log information of the image processing apparatus which includes a job history proving that the file has been subjected to job execution; and log information of the portable information apparatus about the same file; and a log information manager that consolidates the log information of both the image processing apparatus and the portable information, apparatus which is obtained by the log information obtaining portion.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 5 illustrates a log information table including state information of the image processing apparatus;

FIG. 6 illustrates a log information table containing log information of both the image processing apparatus and a portable information apparatus;

FIG. 8 illustrates a log information table containing log information of both the image processing apparatus and the portable information apparatus.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
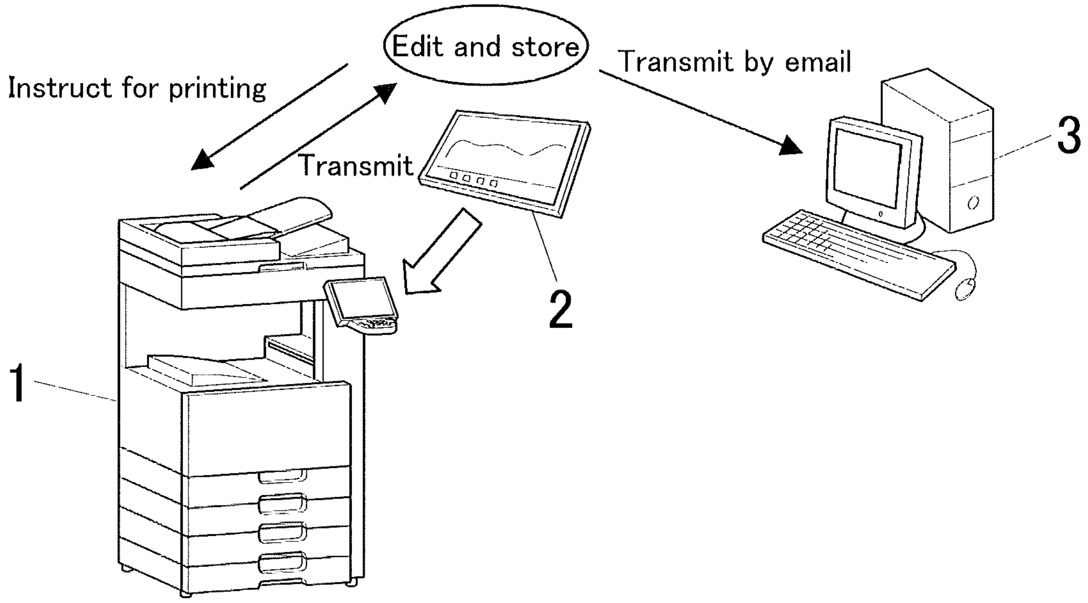
FIG. 1 illustrates a configuration of a cooperative image processing system according to one embodiment of the present invention.

FIG. 1 is a view illustrating a configuration of a cooperative image processing system according to one embodiment of the present invention.

The cooperative image processing system is provided with: an image processing apparatus 1; a portable information apparatus 2 such as a smartphone or a tablet computer terminal; and a user terminal 3 such as a personal computer. The portable information apparatus 2, as will be described later, is configured to edit and store a file received from the image processing apparatus 1, transmit the file to the user terminal 3 by electronic mail, and transmit a print or other job to the image processing apparatus 1 to have it executed thereby on the file.

In this embodiment, a MFP having various functions such as a copier, printer, scanner, and facsimile function, as described above, is employed as the image processing apparatus 1. Hereinafter, the image processing apparatus 1 also will be referred to as MFP.

Figure 2:
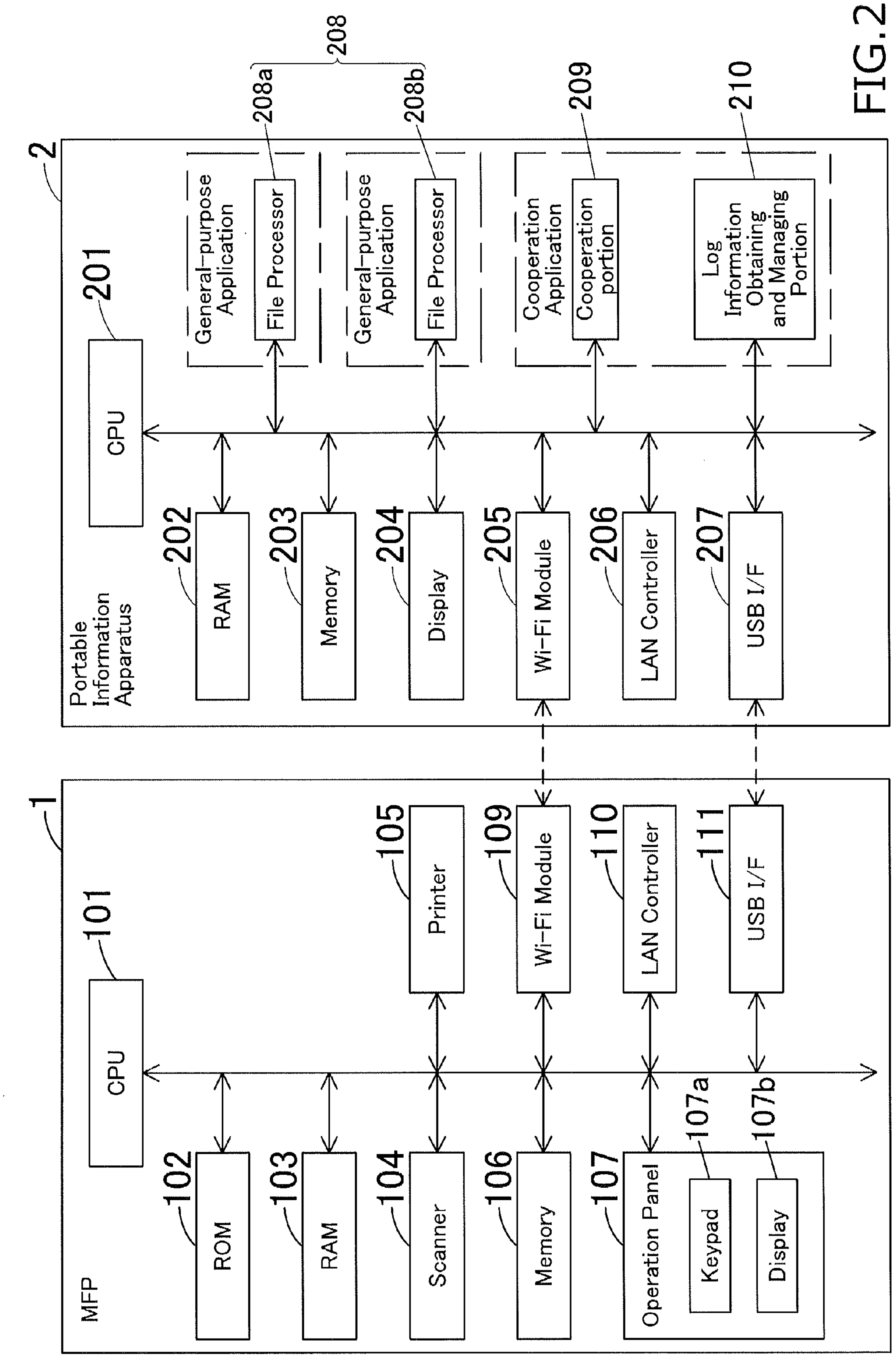
FIG. 2 is a block diagram illustrating a functional configuration of an image processing apparatus and a portable information apparatus.

FIG. 2 is a block diagram illustrating a functional configuration of the MFP 1 and the portable information apparatus 2.

The MFP 1 is provided with: a CPU 101, a ROM 102, a RAM 103, a scanner 104, a printer 105, a memory 106, an operation panel 107, a Wireless Fidelity module (Wi-Fi module) 109, a Local Area Network controller (LAN controller) 110, an USB interface (USB I/F) 111, and the like.

The CPU 101 controls the entire MFP 1 in a unified and systematic manner in accordance with operation programs stored on a memory such as the ROM 102. For example, the CPU 101 controls the MFP 1 such that any of its various functions can be used. In this embodiment, the CPU 101 further composes an operation screen that looks identical with that of the MFP 1 so that it can be displayed on the portable information apparatus 2, creates a file to transmit to the portable information apparatus 2 in accordance with user instructions from the portable information apparatus 2, and executes a print or other job on the file received from the portable information apparatus 2. Furthermore, after creating the file, transmitting the file, and performing processing on the file for example, the CPU 101 generates log information that is an operation history of the MFP 1.

The ROM 102 is a memory which stores operation programs for the CPU 101; the RAM 103 is a memory which provides a work area for the CPU 101 to perform processing in accordance with operation programs.

The scanner 104 reads out images from a document put on a platen glass or an automatic document feeder not shown in the figure and outputs image data that is electronic data.

The printer 105 prints on sheets of paper, image data read out from a document by the scanner 104 and print data received from the portable information apparatus 2 and the user terminal 3.

The memory 106, which consists of a hard disk device, stores various types of data, applications, and the like. Specifically, in this embodiment, the memory 106 stores screen parts data to compose a screen for the portable information apparatus 2 to display on its display portion. When the MFP 1 and the portable information apparatus 2 begin cooperation by connecting to each other, a screen, which looks identical with that on an operation panel of the MFP 1 for users to access functions of the MFP 1 (hereinafter, also will be referred to as "remote screen"), appears on the display portion of the portable information apparatus 2. The screen parts data is composed of materials for the remote screen, including a basic screen for setting the functions and various selection and other keys on the basic screen, for example. In accordance with user instructions from the portable information apparatus 2, the CPU 101 composes a screen by combining necessary screen parts out of the screen parts data stored on the memory 106 and transmits screen data to the portable information apparatus 2. Receiving the screen data from the MFP 1, the portable information apparatus 2 displays a remote screen that looks identical with the operation screen of the MFP 1. The remote screen does not necessarily look identical with the operation screen of the MFP 1.

The operation panel 107 allows users to operate the MFP 1 while displaying messages and other information thereon. The operation panel 107 is provided with: a keypad **107*a* having a Start key, numeric and other keys; and a display portion 107*b*** consisting of a liquid-crystal display, for example, with touch-panel functionality.

The Wi-Fi module 109 is an interface for wireless connection to the portable information apparatus 2; the LAN controller 110 controls the communication with external apparatuses such as personal computers and other MFPs.

The USB interface 111 is an interface for physical connection to the portable information apparatus 2.

Meanwhile, the portable information apparatus 2 consists of a smartphone, a tablet computer terminal, electronic paper, and the like. The portable information apparatus 2 is provided with: a CPU 201; a RAM 202; a memory 203; a display portion 204; a Wi-Fi module 205; a LAN controller 206; an USB interface 207; file processors **208*a* and 208*b*; a cooperation manager 209; a log information obtaining and managing portion 210**; and the like.

The CPU 201 controls the entire portable information apparatus 2 in a unified and systematic manner in accordance with an Operating System (OS), which is basic software, a cooperation application which is explained later or general-purpose applications.

The RAM 202 is a memory which provides a work area for the CPU 201 to perform processing in accordance with operation programs.

The memory 203, which consists of a hard disk device, stores various types of data, applications, and the like. Specifically, in this embodiment, the memory 203 stores programs such as a basic OS, a cooperation application, and general-purpose applications. Hereinafter, applications also will be referred to simply as "app".

The display portion 204 consists of a liquid-crystal display, for example, with touch-panel.

The Wi-Fi module 205 is an interface for wireless connection between the MFP 1 and the portable information apparatus 2; the LAN controller 206 controls the communication with external apparatuses such as the user terminals 3. The USB interface 207 is an interface for physical connection between the MFP 1 and the portable information apparatus 2.

The file processors **208*a* and 208*b* performs processing on a file created by and received from the MFP 1. For example, the file processors 208***a* and 208*b* edits the file, transfers the file, and transmits the file by electronic mail. The file processor 208*a* and 208*b* is further allowed to create a target file to be subjected to job execution by the MFP 1. Furthermore, after editing the file, transferring the file, and transmitting the file by electronic mail for example, the file processor 208*a* and 208*b* generate log information that is an operation history of the portable information apparatus 2. Hereinafter, a file processor 208 will be described as a representative of both the file processors 208*a* and 208*b*.

The cooperation manager 209 facilitates access to the functions of the MFP 1 by achieving smooth cooperation between the MFP 1 and the portable information apparatus 2. Specifically, in order to allow users to access copier, printer, scanner, facsimile and other functions of the MFP 1, the cooperation manager 209 receives screen data from the MFP 1 and displays on the display portion 204, a screen that looks identical with a mode setting screen, for example, on the operation panel 107 of the MFP 1, as a remote screen. When a user touches the remote screen, the cooperation manager 209 further detects the coordinate of a touch position and transmits it to the MFP 1. By analyzing the coordinate of the touch position, the MFP 1 recognizes what the user instruction is and performs its operation accordingly. The cooperation manager 209 further instructs the MFP 1 to create a file and return to the portable information apparatus 2 via the remote screen, and transfers the received file to the file processor 208 in response to a request from the file processor 208.

Subsequently, the cooperation manager 209 receives a target file for job execution from the file processor 208 and transfers it to the MFP 1 along with user instructions for the MFP 1 to execute a job. Furthermore, after receiving and transferring the file, the cooperation manager 209 generates log information that is a performance log proving the evidence of file transfer and receipt.

The log information obtaining and managing portion 210 obtains: log information about a certain file created by the MFP 1, from the MFP 1; and the log information about the same file from the portable information apparatus 2, in order to consolidate the log information of both of them.

By the way, the file processor 208 is enabled to execute its functions when the CPU 201 activates a general-purpose application as described above. The general-purpose application is software to enable the file processor 208 to perform processing on a file created by the MFP 1 and create a target file to be subjected to job execution by the MFP 1. There are various types of general-purpose application; some of them have the function of transmitting a file by electronic mail and others have the function of storing a file on a Web server, for example.

The cooperation manager 209 and the log information obtaining and managing portion 210 are enabled to execute their functions when the CPU 201 activates a cooperation application as described above. That is, the cooperation application is software to achieve smooth cooperation between the MFP 1 and the portable information apparatus 2. Each general-purpose application and the cooperation application are allowed to exchange a file with each other and download a file from each other.

Figure 3:
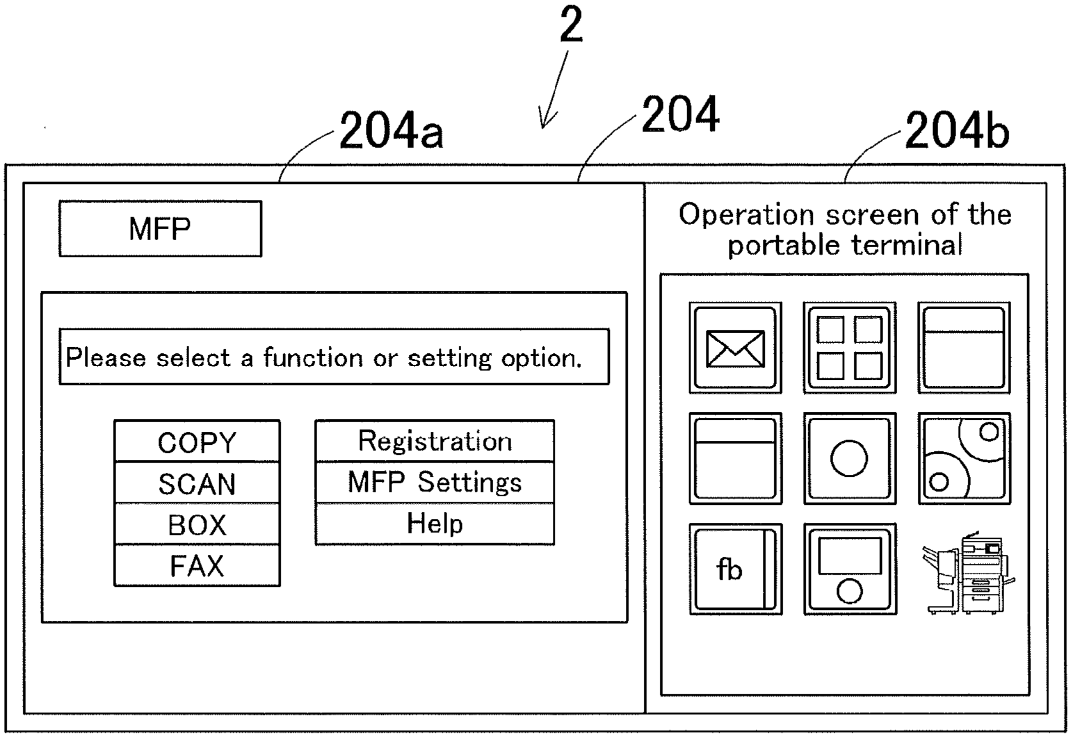
FIG. 3 is a screen view to appear on a display portion of an portable information apparatus when a cooperative processing application is activated thereon.
Figure 4:
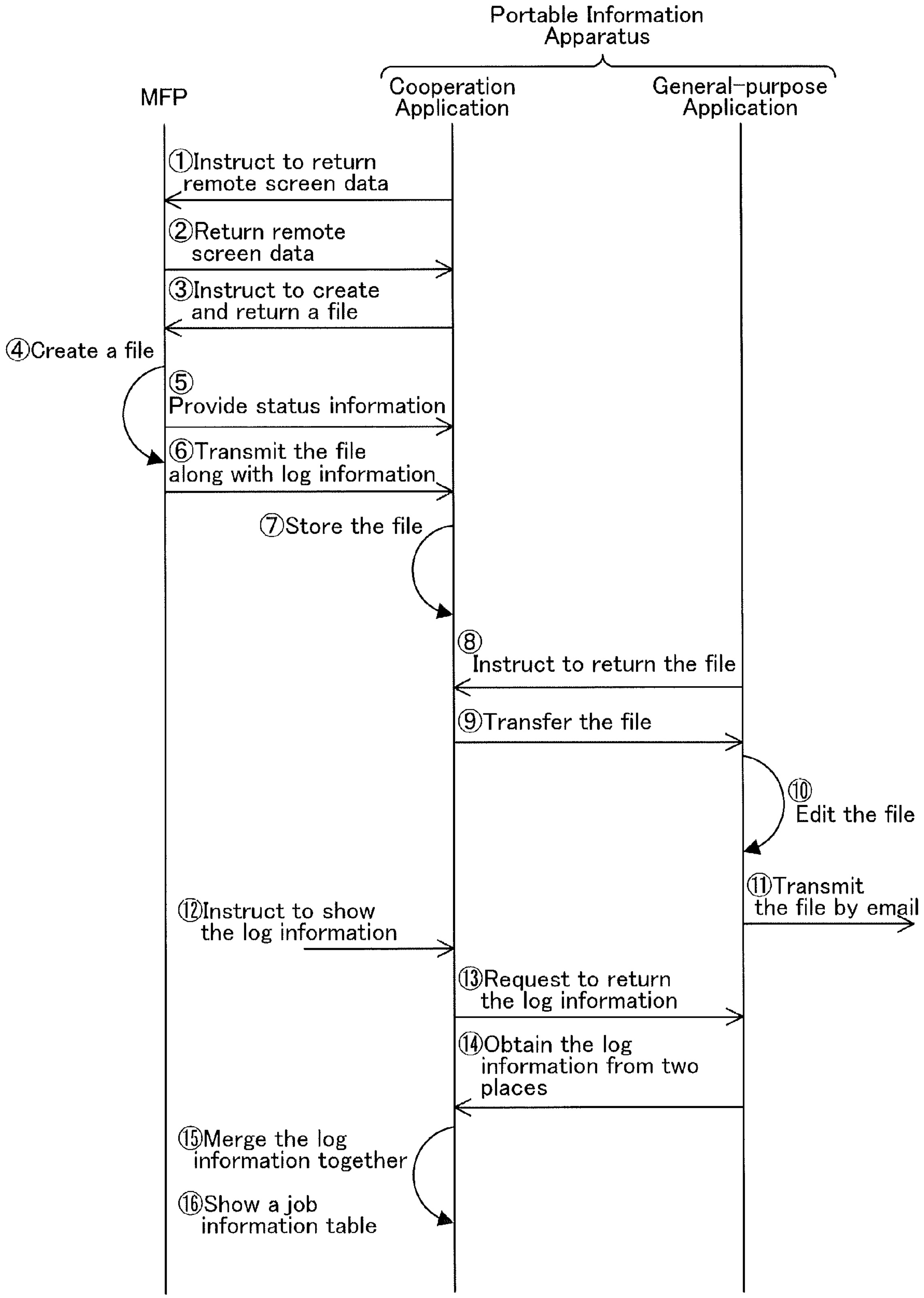
FIG. 4 is a sequence diagram illustrating the information exchange between the image processing apparatus and a portable information apparatus.

Hereinafter, the operations of the cooperative image processing system in FIG. 1 will be described with reference to a screen view of the portable information apparatus 2 in FIG. 3 and a sequence diagram of FIG. 4 which illustrates the information exchange between the MFP 1 and the portable information apparatus 2.

User A physically connects his/her portable information apparatus 2 to the MFP 1 via the USB interface 111 of the MFP 1 and the USB interface 207 of the portable information apparatus 2 or wirelessly connects his/her portable information apparatus 2 to the MFP 1 via the Wi-Fi module 109 of the MFP 1 and the Wi-Fi module 205 of the portable information apparatus 2.

Activating a cooperation application of the portable information apparatus 2, User A instructs the MFP 1 to return remote screen data, by operating the cooperation application (Sequence No. 1 in FIG. 4); in accordance with the user instructions, the MFP 1 returns remote screen data (Sequence No. 2). Then, as illustrated in FIG. 3, a remote screen 204*a* that looks identical with an operation screen on the operation panel 107 of the MFP 1 is displayed in the left side of the display portion 204 of the portable information apparatus 2. In the right side of the display portion 204, an operation screen of the portable information apparatus 2, which includes icons representing general-purpose applications, is displayed.

For example, by operating the remote screen 204*a* on the display portion 204 of the portable information apparatus 2, User A instructs the MFP 1 to create a file by scanning a document put in the automatic document feeder with the scanner 104 and return the file to the portable information apparatus 2 (Sequence No. 3).

Actually, the CPU 201 performs processing in accordance with the cooperation application and the general-purpose applications, making it seem that the portable information apparatus 2 performs its operations by itself. Hereinafter, just for convenience, the description will proceed as if the cooperation application and the general-purpose applications perform processing by themselves.

The cooperation application of the portable information apparatus 2 transmits the coordinate of a touch position of the remote screen to the MFP 1. By analyzing the coordinate of the touch position, the CPU 101 of the MFP 1 recognizes what exists at the touch position and what the user instruction is and creates a file consisting of image data that is electronic data by scanning a document with the scanner 104 (Sequence No. 4). This file is not limited to image data that is obtained from a document by the scanner 104. Alternatively, it may be document data that is read out from a box in the memory 106 of the MFP 1, for example, in accordance with user instructions.

After creating a file by document scanning, the CPU 101 of the MFP 1 transmits the file to the portable information apparatus 2 in accordance with user instructions (Sequence No. 6). While performing this series of operations, the CPU 101 of the MFP 1 keeps providing state information such as "Now scanning", "Successfully finished scanning", "Now transmitting", and "Successfully finished transmitting" to the portable information apparatus 2 (Sequence No. 5). The CPU 101 of the MFP 1 generates log information about the file, which is a scanning history proving the evidence of document scanning, a transmission history proving the evidence of transmission, or another history and stores the log information on a memory such as the memory 106. Furthermore, after transmitting the file consisting of image data, the CPU 101 of the MFP 1 provides the log information to the portable information apparatus 2, as parameters (a control file) (Sequence No. 6).

Receiving the file and the log information separately from the MFP 1, the cooperation application of the portable information apparatus 2 stores the file on a file storage of the memory 203 and the log information on a log information storage of the memory 203 (Sequence No. 7). Meanwhile, the state information of the MFP 1 is displayed on the display portion 204 of the portable information apparatus 2 and stored on the portable information apparatus 2 just like the log information of the MFP 1.

After activating a preferred general-purpose application, User A gives instructions to return that file, by operating the cooperation application, so that he/she can edit the file and transmit it by electronic mail, for example, by operating the general-purpose application (Sequence No. 8). In accordance with the user instructions, the cooperation application transfers the file stored on the file storage of the memory 203, to the general-purpose application (Sequence No. 9). Thus the general-purpose application successfully downloads the file.

The general-purpose application edits the downloaded file and transmits by electronic mail, depending on its functions (Sequence No. 10 and 11). After editing and transmitting the file, the general-purpose application generates log information and store on the memory 203.

Activating the cooperation application again, User A gives instructions to show the log information about the file (Sequence No. 12). In accordance with the user instructions, the cooperation application requests the general-purpose application to return the log information about the file, which is generated thereby (Sequence No. 13), and receives the log information therefrom (Sequence No. 14). Subsequently, the cooperation application generates a log information table to consolidate the log information of both the MFP 1 and the portable information apparatus 2 about the file in chronological order, by merging the log information received from the general-purpose application and the other log information stored on the memory 203 (Sequence No. 15), and manages these log information together. Also, the cooperation application displays the log information table on the display portion 204 of the portable information apparatus 2 (Sequence No. 16).

FIG. 5 is a log information table including state information of the MFP 1, which is stored on the memory 203. The log information table, which contains log information of the MFP 1, is composed of the following columns: state information, time, user name, title of document, destination, and operation at the destination. In FIG. 5, the log information of the MFP 1 is a history proving the evidence of file transmission for example. Instead, it may be a history of document scanning.

FIG. 6 is a log information table containing the log information of both the MFP 1 and the portable information apparatus 2. The log information of the MFP 1 and the portable information apparatus 2 are represented by the codes 301 and 302, respectively. In FIG. 6, the log information proves that the file has been received from the MFP 1, then downloaded, edited, and transmitted by electronic mail by a general-purpose application in accordance with instructions of User A.

As described above, in this embodiment, the portable information apparatus 2 obtains log information of both the MFP 1 and the portable information apparatus 2 to consolidate it by the portable information apparatus itself, which contributes to the user convenience in searching for a certain file that has been created by the MFP 1 and subjected to processing by the portable information apparatus 2 cooperatively.

In this embodiment, the MFP 1, after creating and transmitting a file, automatically provides log information to the portable information apparatus 2 while the portable information apparatus 2 only waits to receive it without any action to the MFP 1. Alternatively, the MFP 1 may return log information to the portable information apparatus 2 in response to a request from the portable information apparatus 2.

Specifically, in this case, the portable information apparatus 2 may transmit such a request to the MFP 1 when receiving a file from the MFP 1; when a user performs a certain operation; or at regular time intervals set in advance.

Furthermore, in this embodiment, the cooperation application obtains an operation log (log information) from the general-purpose application. Instead of an operation log, the cooperation application may use as log information a performance log proving the evidence of the file transfer to the general-purpose application, which is generated by the cooperation application itself.

Furthermore, in this embodiment, the cooperation application obtains log information from the general-purpose application when a user gives instructions to show the log information. Alternatively, the cooperation application may obtain log information from the general-purpose application when transferring a file to the general-purpose application; when receiving a request for file transfer from the general-purpose application; when the general-purpose application finishes processing on a file; when a user performs a certain operation other than giving instructions to show the log information; or at regular time intervals set in advance.

Figure 7:
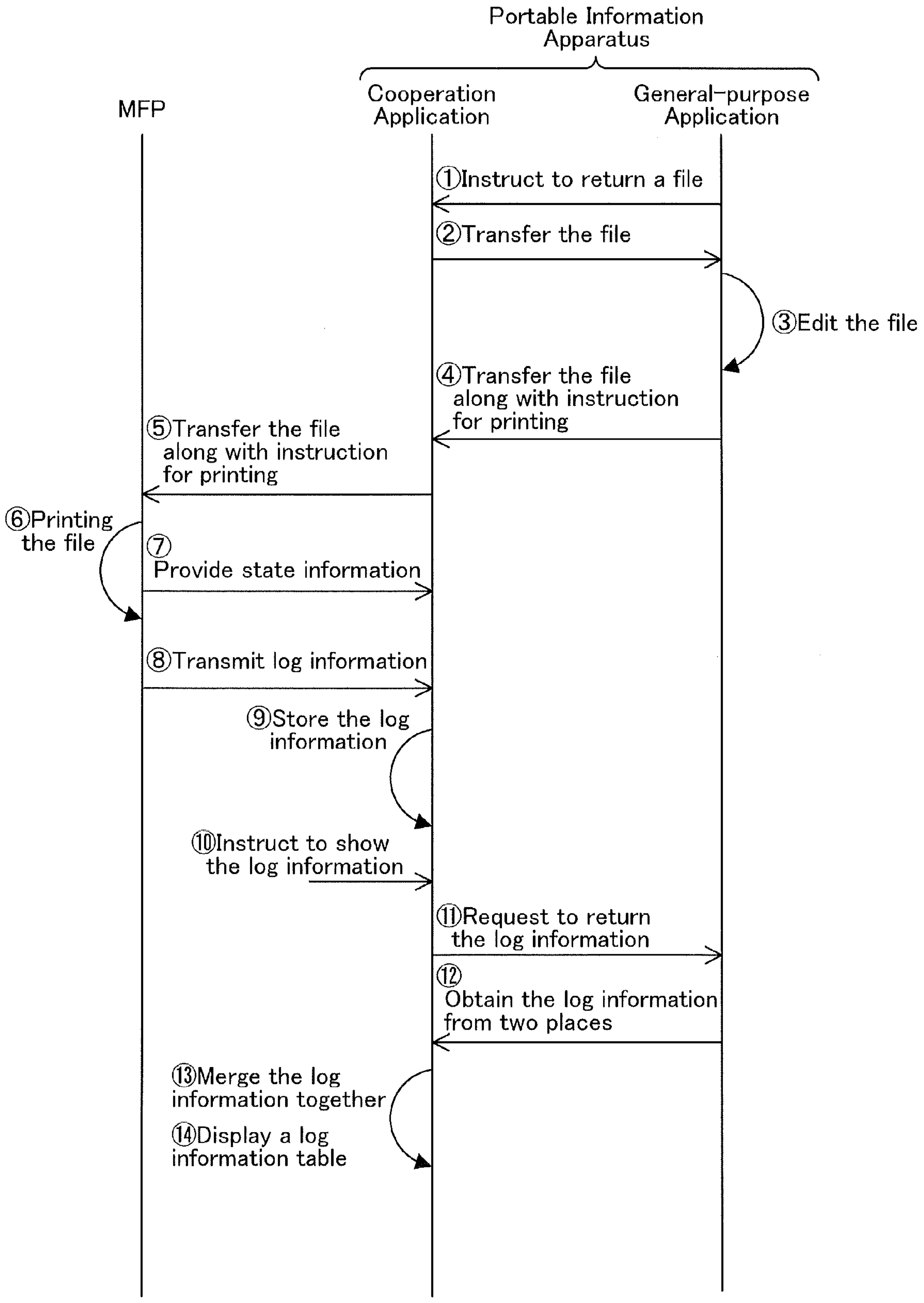
FIG. 7, which relates to another embodiment of the present invention, is a sequence diagram illustrating the information exchange between the image processing apparatus and a portable information apparatus.

FIG. 7, which relates to another embodiment of the present invention, is a sequence diagram illustrating the information exchange between the MFP 1 and the portable information apparatus 2.

In this embodiment, the portable information apparatus 2 transmits to the MFP 1*a* target file for job execution created by a general-purpose application of the portable information apparatus 2 itself, for the MFP 1 to execute a job.

After activating a preferred general-purpose application, User B gives instructions to return the target file, by operating the cooperation application, so that he/she can edit the file sent from the MFP1 by operating the general-purpose application (Sequence No. 1 in FIG. 7). In accordance with the user instructions, the cooperation application transfers the target file stored on the file storage of the memory 203, to the general-purpose application (Sequence No. 2). Thus the general-purpose application successfully downloads the file.

The general-purpose application edits the downloaded file as necessary to obtain a target file for job execution, depending on its functions (Sequence No. 3). After obtaining the target file, User B instructs the MFP 1 to execute a job (a print job, for example) and transfer the target file to the cooperation application, by operating the general-purpose application (Sequence No. 4).

The cooperation application further transfers the target file to the MFP 1 along with print instructions, using the LPR command (Sequence No. 5). The general-purpose application generates log information proving the evidence of a series of file creation, print instructions, and the like, and stores the log information on the memory 203.

Receiving the file along with print instructions, the MFP 1 performs printing (Sequence No. 6). While performing this series of operations, the MFP 1 keeps providing state information such as "Now transmitting" and "successfully finished transmitting" to the portable information apparatus 2 (Sequence No. 7). The MFP 1 generates log information that is a print job history proving the evidence of printing and stores the log information on a memory such as the memory 106. Furthermore, after printing the file, the MFP 1 transmits the log information to the portable information apparatus 2 (Sequence No. 8).

Receiving the log information from the MFP 1, the cooperation application of the portable information apparatus 2 stores the log information on a log information storage of the memory 203 (Sequence No. 9). Meanwhile, the state information of the MFP 1 is displayed on the display portion 204 of the portable information apparatus 2 and stored on the portable information apparatus 2 just like the log information of the MFP 1.

Activating the cooperation application again, User B gives instructions to show the log information about the file (Sequence No. 10). In accordance with the user instructions, the cooperation application requests the general-purpose application to return the log information about the file, which is generated thereby (Sequence No. 11), and receives the log information therefrom (Sequence No. 12). Subsequently, the cooperation application generates a log information table to consolidate the log information of both the MFP 1 and the portable information apparatus 2 about the file in chronological order, by merging the log information received from the general-purpose application and the other log information stored on the memory 203 (Sequence No. 13). Also, the cooperation application displays the log information table on the display portion 204 of the portable information apparatus 2 (Sequence No. 14).

FIG. 8 is a log information table containing the log information of both the MFP 1 and the portable information apparatus 2. In this embodiment, the log information table of FIG. 8 includes, in addition to the entire content of the log information table of FIG. 6, the log information caused by operations of User B about the same file.

The log information of the MFP 1 and the portable information apparatus 2 are represented by the codes 301 and 302, respectively, which is the same content as that in FIG. 6. The log information of the MFP 1 about a print job is represented by the code 303; the log information of the portable information apparatus 2 about the same print job is represented by the code 304.

As described above, in this embodiment, the portable information apparatus 2 obtains log information of both the MFP 1 and the portable information apparatus 2 to consolidate it by the portable information apparatus 2 itself, which contributes to the user convenience in searching for a certain file that has been created by the portable information apparatus 2 and subjected to job execution by the MFP 1 cooperatively.

In this embodiment of FIG. 7, the MFP 1, after its job execution, automatically provides log information to the portable information apparatus 2 while the portable information apparatus 2 only waits to receive it without any action to the MFP 1. Alternatively, the MFP 1 may return log information to the portable information apparatus 2 in response to a request from the portable information apparatus 2.

Specifically, in this case, the portable information apparatus 2 may transmit such a request to the MFP 1 when receiving a notice of the completion of job execution from the MFP 1 after the job execution; when a user performs a certain operation; or at regular time intervals set in advance.

Furthermore, in this embodiment, the cooperation application obtains an operation log (log information) from the general-purpose application. Instead of an operation log, the cooperation application may use as log information a performance log proving the evidence of the file receipt from the general-purpose application.

Furthermore, in this embodiment, the cooperation application obtains log information from the general-purpose application when a user gives instructions to show the log information. Alternatively, the cooperation application may obtain log information from the general-purpose application when receiving a file from the general-purpose application; when a user performs a certain operation other than giving instructions to show the log information; or at regular time intervals set in advance.

Figure 9:
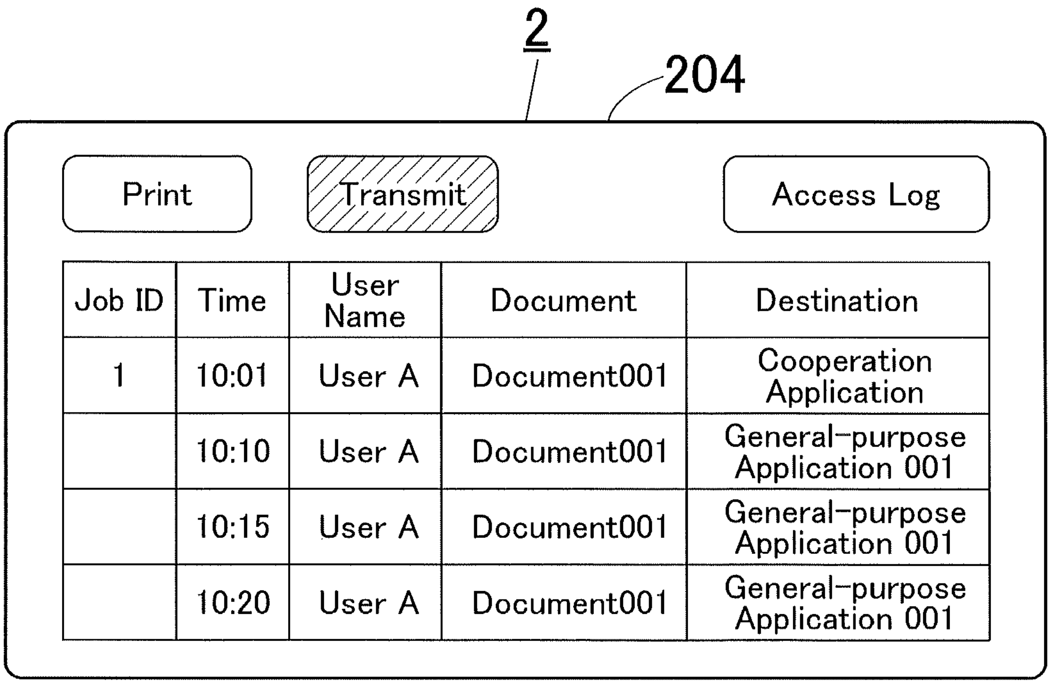
FIG. 9 is a screen view to appear on the display portion of the portable information apparatus when a user gives instructions to show log information, by operating a cooperation application.

FIG. 9 is a screen view to appear on the display portion 204 of the portable information apparatus 2 when User A gives instructions to show log information by operating the cooperation application. There are a "Print" button, a "Transmit" button, and a "Access" button in this screen, and users can select any.

The "Print" button serves to show log information (a print job history) about a file having been transmitted to the MFP 1 from the portable information apparatus 2, which proves the evidence of printing by the MFP 1. The "Transmit" button serves to show log information (a transmission history) proving the evidence of the file transmission to the MFP 1 from the portable information apparatus 2 and log information (a transfer history) proving the evidence of the file transfer from the cooperation application to the general-purpose application. The "Access" button serves to show log information proving the evidence of operations of the MFP 1 as instructed by the portable information apparatus 2.

As illustrated in FIG. 9, the "Transmit" button has hatching, which indicates that the button is pressed by a user. When the "Transmit" button is pressed, the cooperation application of the portable information apparatus 2 detects and displays a transmission history relevant with the user, out of the table of FIG. 6 or FIG. 8 containing the log information of both the MFP 1 and the portable information apparatus 2. The cooperation application does exactly the same also when the "Print" or "Access" button is pressed.

As described above, the portable information apparatus 2 consolidates log information of both the MFP 1 and the portable information apparatus 2 itself, and users therefore can view a log information table simply by operating their portable information apparatuses 2.

While more than one embodiment of the present invention has been described in detail herein and shown in the accompanying drawings, it should be understood that the present invention is not limited to the foregoing embodiments.

For example, in these embodiments, the general-purpose application of the portable information apparatus 2 uses a file created by the MFP 1 as a target file for job execution or obtains a target file for job execution by editing a file created by the MFP 1; and after job execution by the MFP 1, log information of the MFP 1 and log information of the portable information apparatus 2 are merged together to form one table about the target file. However, the general-purpose application does not necessarily have to use a file created by the MFP 1 as a target file for job execution.

Furthermore, in these embodiments, the general-purpose application may download a file that is stored on an apparatus other than the portable information apparatus 2 after being created by the MFP 1, and transfer it to the MFP 1 as a target file for job execution along with user instructions for the MFP 1 to execute a job. Specifically, in this case, the portable information apparatus 2 may consolidate log information of both the MFP 1 and the portable information apparatus 2 which includes a transmission history proving that the file created by the MFP 1 has been transmitted to apparatuses other than the portable information apparatus 2.

Furthermore, in these embodiments, the portable information apparatus 2 may consolidate log information of both the MFP 1 and the portable information apparatus 2 to transmit to the MFP 1 so that the MFP 1 can overwrite its log information with it. With this configuration of the cooperative image processing system, users can print out log information of both the MFP 1 and the portable information apparatus 2 by the MFP1.

The present invention, whose more than one embodiment has been described in detail herein, can solve the unsolved problems by its following modes.

[1] A cooperative image processing system comprising an image processing apparatus and a portable information apparatus capable of connecting to each other physically or wirelessly, the image processing apparatus comprising:

a file creator that creates a file in accordance with user instructions from the portable information apparatus;

a transmitter that transmits the file created by the file creator, to the portable information apparatus in accordance with user instructions from the portable information apparatus; and a log information generator that generates log information of the image processing apparatus which includes a transmission history proving that the file has been transmitted by the transmitter, the portable information apparatus comprising:

a display;

one or more file processors that perform processing on the file created by the file creator of the image processing apparatus;

a cooperation portion that shows on the display an operation screen through which to use functions of the image processing apparatus; transmits user instructions for creating and transmitting the file, which are entered through the operation screen, to the image processing apparatus; receives the file created by the image processing apparatus, in exchange for the user instructions; and transfers the file to any one of the one or more file processors in response to a request therefrom;

a log information obtaining portion that obtains the log information of the image processing apparatus about the file, which is generated by the log information generator of the image processing apparatus, and log information of the portable information apparatus about the same file; and a log information manager that consolidates the log information of both the image processing apparatus and the portable information apparatus, which is obtained by the log information obtaining portion.

[2] The cooperative image processing system as recited in the foregoing item [1], wherein the log information obtaining portion of the portable information apparatus obtains the log information of the image processing apparatus by transmitting a request for the log information to the image processing apparatus or simply by waiting to receive it from the image processing apparatus.

[3] The cooperative image processing system as recited in the foregoing item [2], wherein the log information obtaining portion of the portable information apparatus transmits a request for the log information to the image processing apparatus when receiving the file from the image processing apparatus; when a user performs a certain operation; or at regular time intervals.

[4] The cooperative image processing system as recited in any one of the foregoing items [1] to [3], wherein the log information obtaining portion of the portable information apparatus obtains the log information of the portable information apparatus by collecting operation logs from the one or more file processors.

[5] The cooperative image processing system as recited in any one of the foregoing items [1] to [3], wherein the log information obtaining portion of the portable information apparatus obtains a performance log proving that the file has been transferred to the any one of the one or more file processors, as the log information of the portable information apparatus.

[6] The cooperative image processing system as recited in any one of the foregoing items [1] to [5], wherein the log information obtaining portion of the portable information apparatus obtains the log information of the portable information apparatus when transferring the file to the any one of the one or more file processors; when receiving a request for the file from the any one of the one or more file processors; when the any one of the one or more file processors finishes its processing on the file; when a user performs a certain operation; or at regular time intervals.

[7] A cooperative image processing system comprising an image processing apparatus and a portable information apparatus capable of connecting to each other physically or wirelessly, the image processing apparatus comprising:

a job execution portion that executes a job on a file in accordance with user instructions from the portable information apparatus; and a log information generator that generates log information of the image processing apparatus which includes a job history proving that the file has been subjected to job execution by the job execution portion, the portable information apparatus comprising:

a display;

one or more file processors that creates a target file for job execution;

a cooperation portion that shows on the display an operation screen through which to use functions of the image processing apparatus; receives the target file created by the one or more file processors; and transmits the target file to the image processing apparatus along with user instructions for job execution entered through the operation screen;

a log information obtaining portion that obtains: the log information of the image processing apparatus about the file, which is generated by the log information generator of the image processing apparatus; and log information of the portable information apparatus about the same file; and a log information manager that consolidates the log information of both the image processing apparatus and the portable information apparatus, which is obtained by the log information obtaining portion.

[8] The cooperative image processing system as recited in the foregoing item [7], wherein the log information obtaining portion of the portable information apparatus obtains the log information of the image processing apparatus by transmitting a request for the log information to the image processing apparatus or simply by waiting to receive it from the image processing apparatus.

[9] The cooperative image processing system as recited in the foregoing item [8], wherein the log information obtaining portion of the portable information apparatus transmits a request for the log information to the image processing apparatus when receiving a notice of the completion of job execution from the image processing apparatus after the job execution by the job execution portion; when a user performs a certain operation; or at regular time intervals.

[10] The cooperative image processing system as recited in any one of the foregoing items [7] to [9], wherein the log information obtaining portion of the portable information apparatus obtains the log information of the portable information apparatus by collecting operation logs from the one or more file processors.

[11] The cooperative image processing system as recited in any one of the foregoing items [7] to [9], wherein the log information obtaining portion of the portable information apparatus obtains a performance log proving that the file has been received from any one of the one or more file processors, as the log information of the portable information apparatus.

[12] The cooperative image processing system as recited in any one of the foregoing items [7] to [11], wherein the log information obtaining portion of the portable information apparatus obtains the log information of the portable information apparatus when receiving the file from any one of the one or more file processors; when a user performs a certain operation; or at regular time intervals.

[13] The cooperative image processing system as recited in any one of the foregoing items [1] to [12], wherein the portable information apparatus further comprises a display controller that allows the display to display a table of the log information of both the image processing apparatus and the portable information apparatus about the file, which is consolidated by the log information manager, in accordance with user instructions.

[14] The cooperative image processing system as recited in any one of the foregoing items [1] to [13], wherein:

the portable information apparatus further comprises a transmitter that transmits the log information of both the image processing apparatus and the portable information apparatus which is consolidated by the log information manager, to the image processing apparatus; and the image processing apparatus allows overwriting the log information of the image processing apparatus itself which is generated by the log information generator, with the log information of both the image processing apparatus and the portable information apparatus which is received from the portable information apparatus.

[15] The cooperative image processing system as recited in any one of the foregoing items [1] to [14], wherein:

the portable information application has a cooperation application and one or more general-purpose applications both of which are installed thereon and further comprises an application controller that enables the cooperation application and the one or more general-purpose applications; and the application controller enables the cooperation application, the log information obtaining portion, and the log information manager by activating the cooperation application and enables the one or more file processors by activating the one or more general-purpose applications.

[16] A cooperative image processing method to be implemented by an cooperative image processing system comprising an image processing apparatus and a portable information apparatus capable of connecting to each other physically or wirelessly, the cooperative image processing method comprising:

the following steps of the image processing apparatus:

creating a file in accordance with user instructions from the portable information apparatus;

transmitting the created file to the portable information apparatus in accordance with user instructions from the portable information apparatus; and generating log information of the image processing apparatus which includes a transmission history proving that the file has been transmitted; and the following steps of the portable information apparatus:

performing processing on the created file;

showing on a display an operation screen through which to use functions of the image processing apparatus; transmitting user instructions for creating and transmitting the file, which are entered through the operation screen, to the image processing apparatus; receiving the created file in exchange for the user instructions; and transferring the file in response to a request so that the file can be subjected to processing;

obtaining: the log information of the image processing apparatus about the file, which is generated by the image processing apparatus; and log information of the portable information apparatus about the same file; and consolidating the log information of both the image processing apparatus and the portable information apparatus, which is obtained.

[17] A cooperative image processing method to be implemented by an cooperative image processing system comprising an image processing apparatus and a portable information apparatus capable of connecting to each other physically or wirelessly, the cooperative image processing method comprising:

the following steps of the image processing apparatus:

executing a job on a file in accordance with user instructions from the portable information apparatus; and generating log information of the image processing apparatus which includes a job history proving that the file has been subjected to job execution; and the following steps of the portable information apparatus:

creating a target file for job execution;

showing on a display, an operation screen through which to use functions of the image processing apparatus; receiving the created target file; and transmitting the target file to the image processing apparatus along with user instructions for job execution entered through the operation screen;

obtaining: the log information of the image processing apparatus about the file, which is generated by the image processing apparatus; and log information of the portable information apparatus about the same file; and consolidating the log information of both the image processing apparatus and the portable information apparatus, which is obtained.

[18] An image processing apparatus capable of connecting to a portable information apparatus physically or wirelessly, the image processing apparatus comprising:

a file creator that creates a file in accordance with user instructions from the portable information apparatus;

a transmitter that transmits the file created by the file creator, to the portable information apparatus in accordance with user instructions from the portable information apparatus; and a log information generator that generates log information of the image processing apparatus which includes a transmission history proving that the file has been transmitted by the transmitter, wherein the transmitter transmits the log information generated by the log information generator to the portable information apparatus without waiting for or in response to a request from the portable information apparatus.

[19] An image processing apparatus capable of connecting to a portable information apparatus physically or wirelessly, the image processing apparatus comprising:

a job execution portion that executes a job on a file in accordance with user instructions from the portable information apparatus;

a log information generator that generates log information of the image processing apparatus which includes a job history proving that the file has been subjected to job execution by the job execution portion; and a transmitter that transmits the log information generated by the log information generator to the portable information apparatus without waiting for or in response to a request from the portable information apparatus.

[20] A non-transitory computer-readable recording medium with a cooperation program being stored thereon to make a computer of an image processing apparatus capable of connecting to a portable information apparatus physically or wirelessly, execute the following steps:

creating a file in accordance with user instructions from the portable information apparatus;

transmitting the created file to the portable information apparatus in accordance with user instructions from the portable information apparatus; and generating log information of the image processing apparatus which includes a transmission history proving that the file has been transmitted, wherein the generated log information is transmitted to the portable information apparatus without waiting for or in response to a request from the portable information apparatus.

[21] A non-transitory computer-readable recording medium with a cooperation program being stored thereon to make a computer of an image processing apparatus capable of connecting to a portable information apparatus physically or wirelessly, execute the following steps:

executing a job on a file in accordance with user instructions from the portable information apparatus;

generating log information of the image processing apparatus which includes a job history proving that the file has been subjected to job execution; and transmitting the generated log information to the portable information apparatus without waiting for or in response to a request from the portable information apparatus.

[22] A portable information apparatus capable of connecting to an image processing apparatus physically or wirelessly, the portable information apparatus comprising:

a display;

one or more file processors that perform processing on a file created by the image processing apparatus;

a cooperation portion that shows on the display an operation screen through which to use functions of the image processing apparatus; transmits user instructions for creating and transmitting the file, which are entered through the operation screen, to the image processing apparatus; receives the file created by the image processing apparatus, in exchange for the user instructions; and transfers the file to any one of the one or more file processors in response to a request therefrom;

a log information obtaining portion that obtains: log information of the image processing apparatus which includes a transmission history proving that the file has been transferred; and log information of the portable information apparatus about the same file; and a log information manager that consolidates the log information of both the image processing apparatus and the portable information apparatus, which is obtained by the log information obtaining portion.

[23] A portable information apparatus capable of connecting to an image processing apparatus physically or wirelessly, the portable information apparatus comprising:

a display;

one or more file processors that creates a target file for job execution;

a cooperation portion that shows on the display an operation screen through which to use functions of the image processing apparatus; receives the target file created by the one or more file processors; and transmits the target file to the image processing apparatus along with user instructions for job execution entered through the operation screen;

a log information obtaining portion that obtains: log information of the image processing apparatus which includes a job history proving that the file has been subjected to job execution; and log information of the portable information apparatus about the same file; and a log information manager that consolidates the log information of both the image processing apparatus and the portable information, apparatus which is obtained by the log information obtaining portion.

According to the aforementioned mode of the invention [1], the image processing apparatus creates a file and transmits it to the portable information apparatus both in accordance with user instructions entered from an operation screen through which to use functions of the image processing apparatus, which is displayed on the portable information apparatus by a cooperation portion of the portable information apparatus. Then the image processing apparatus generates log information including a transmission log proving that the file has been transmitted by the image processing apparatus. The cooperation portion of the portable information apparatus transfers the file to a file processor in response to a request therefrom and obtains the log information of the image processing apparatus about the file, which is generated by the image processing apparatus, and log information of the portable information apparatus about the same file. Thus the portable information consolidates the log information of both the image processing apparatus and the portable information apparatus.

As described above, the portable information apparatus obtains log information of both the image processing apparatus and the portable information apparatus to consolidate it by the portable information apparatus itself, which contributes to the user convenience in searching for a certain file that has been created by the image processing apparatus and subjected to processing by the portable information apparatus cooperatively.

According to the aforementioned mode of the invention [2], the portable information apparatus obtains the log information of the image processing apparatus by transmitting a request for the log information to the image processing apparatus or simply by waiting to receive it from the image processing apparatus, which ensures the implementation of taking possession of the log information of the image processing apparatus.

According to the aforementioned mode of the invention [3], the portable information apparatus transmits a request for the log information to the image processing apparatus when receiving the file from the image processing apparatus; when a user performs a certain operation; or at regular time intervals, which ensures the implementation of taking possession of the log information of the image processing apparatus.

According to the aforementioned mode of the invention [4], the portable information apparatus obtains the log information of the portable information apparatus itself by collecting operation logs from the one or more file processors.

According to the aforementioned mode of the invention [5], the portable information apparatus obtains a performance log proving that the file has been transferred to any one of the one or more file processors, as the log information of the portable information apparatus itself.

According to the aforementioned mode of the invention [6], the portable information apparatus obtains the log information of the portable information apparatus itself when transferring the file to the any one of the one or more file processors; when receiving a request for the file from the any one of the one or more file processors; when the any one of the one or more file processors finishes its processing on the file; when a user performs a certain operation; or at regular time intervals, which ensures the implementation of taking possession of the log information of the portable information apparatus.

According to the aforementioned mode of the invention [7], the portable information apparatus creates a target file for job execution and transmits it to the image processing apparatus along with user instructions entered from an operation screen through which to use functions of the image processing apparatus, which is displayed on the portable information apparatus by a cooperation portion of the portable information apparatus. The image processing apparatus executes a job on the file in accordance with user instructions from the portable information apparatus then generates log information. The portable information apparatus obtains the log information of the image processing apparatus about the file, which is generated by the image processing apparatus, and log information of the portable information apparatus about the same file. Thus the portable information consolidates the log information of both the image processing apparatus and the portable information apparatus.

As described above, the portable information apparatus obtains log information of both the image processing apparatus and the portable information apparatus to consolidate it by the portable information apparatus itself, which contributes to the user convenience in searching for a certain file that has been created by the portable information apparatus and subjected to job execution by the image processing apparatus cooperatively.

According to the aforementioned mode of the invention [8], the portable information apparatus obtains the log information of the image processing apparatus by transmitting a request for the log information to the image processing apparatus or simply by waiting to receive it from the image processing apparatus, which ensures the implementation of taking possession of the log information of the image processing apparatus.

According to the aforementioned mode of the invention [9], the portable information apparatus transmits a request for the log information to the image processing apparatus when receiving a notice of the completion of job execution from the image processing apparatus after the job execution; when a user performs a certain operation; or at regular time intervals, which ensures the implementation of taking possession of the log information of the image processing apparatus.

According to the aforementioned mode of the invention [10], the portable information apparatus obtains the log information of the portable information apparatus itself by collecting operation logs from the one or more file processors.

According to the aforementioned mode of the invention [11], the portable information apparatus obtains a performance log proving that the file has been received from any one of the one or more file processors, as the log information of the portable information apparatus itself.

According to the aforementioned mode of the invention [12], the portable information apparatus obtains the log information of the portable information apparatus itself when receiving the file from the any one of the one or more file processors; when a user performs a certain operation; or at regular time intervals, which ensures the implementation of taking possession of the log information of the portable information apparatus.

According to the aforementioned mode of the invention [13], the portable information apparatus allows the display to display a table of the log information of both the image processing apparatus and the portable information apparatus about the file, which is consolidated by the portable information apparatus itself, in accordance with user instructions.

According to the aforementioned mode of the invention [14], the image processing apparatus overwrites its log information with the log information of both the image processing apparatus and the portable information apparatus which is received from the portable information apparatus, which allows users to instruct the image processing apparatus to print out the log information of both the image processing apparatus and the portable information apparatus, by operating the portable information apparatus.

According to the aforementioned mode of the invention [15], the application controller enables the cooperation portion, the log information obtaining portion, and the log information manager of the portable information application by activating the cooperation application installed on the portable information apparatus and enables the one or more file processors by activating the one or more general-purpose applications.

According to the aforementioned mode of the invention [16], the portable information apparatus obtains log information of both the image processing apparatus and the portable information apparatus to consolidate it by the portable information apparatus itself, which contributes to the user convenience in searching for a certain file that has been created by the image processing apparatus and subjected to processing by the portable information apparatus cooperatively.

According to the aforementioned mode of the invention [17], the portable information apparatus obtains log information of both the image processing apparatus and the portable information apparatus to consolidate it by the portable information apparatus itself, which contributes to the user convenience in searching for a certain file that has been created by the portable information apparatus and subjected to job execution by the image processing apparatus cooperatively.

According to the aforementioned mode of the invention [18], the image processing apparatus transmits to the portable information apparatus its log information including a transmission history proving that the file created by the image processing apparatus has been transmitted to the portable information apparatus, without waiting for or in response to a request from the portable information apparatus.

According to the aforementioned mode of the invention [19], the image processing apparatus transmits to the portable information apparatus its log information including a job history proving that the file created by the portable information apparatus has been subjected to job execution by the image processing apparatus, without waiting for or in response to a request from the portable information apparatus.

According to the aforementioned mode of the invention [20], a computer of the image processing apparatus is allowed to execute the step of transmitting to the portable information apparatus, log information of the image processing apparatus, which includes a transmission history proving that the file created by the image processing apparatus has been transmitted to the portable information apparatus, without waiting for or in response to a request from the portable information apparatus.

According to the aforementioned mode of the invention [21], a computer of the image processing apparatus is allowed to execute the step of transmitting to the portable information apparatus, log information of the image processing apparatus, which includes a transmission history proving that the file created by the image processing apparatus has been transmitted to the portable information apparatus, without waiting for or in response to a request from the portable information apparatus.

According to the aforementioned mode of the invention [22], the portable information apparatus consolidates its log information and log information of the image processing apparatus about a file having been created by the image processing apparatus and subjected to processing by the portable information apparatus cooperatively.

According to the aforementioned mode of the invention [23], the portable information apparatus consolidates its log information and log information of the image processing apparatus about a file having been created by the portable information apparatus and subjected to job execution by the image processing apparatus cooperatively.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A cooperative image processing system comprising an image processing apparatus and a portable information apparatus capable of connecting to each other physically or wirelessly, the image processing apparatus comprising:

a file creator that creates a file in accordance with user instructions from the portable information apparatus;

a transmitter that transmits the file created by the file creator, to the portable information apparatus in accordance with user instructions from the portable information apparatus; and a log information generator that generates log information of the image processing apparatus which includes a transmission history proving that the file has been transmitted by the transmitter, the portable information apparatus comprising:

a display;

one or more file processors that perform processing on the file created by the file creator of the image processing apparatus;

a cooperation portion that shows on the display an operation screen through which to use functions of the image processing apparatus; transmits user instructions for creating and transmitting the file, which are entered through the operation screen, to the image processing apparatus; receives the file created by the image processing apparatus, in exchange for the user instructions; and transfers the file to any one of the one or more file processors in response to a request therefrom;

a log information obtaining portion that obtains the log information of the image processing apparatus about the file, which is generated by the log information generator of the image processing apparatus, and log information of the portable information apparatus about the same file; and a log information manager that consolidates the log information of both the image processing apparatus and the portable information apparatus, which is obtained by the log information obtaining portion.

2. The cooperative image processing system as recited in claim 1, wherein the log information obtaining portion of the portable information apparatus obtains the log information of the image processing apparatus by transmitting a request for the log information to the image processing apparatus or simply by waiting to receive it from the image processing apparatus.

3. The cooperative image processing system as recited in claim 2, wherein the log information obtaining portion of the portable information apparatus transmits a request for the log information to the image processing apparatus when receiving the file from the image processing apparatus; when a user performs a certain operation; or at regular time intervals.

4. The cooperative image processing system as recited in claim 1, wherein the log information obtaining portion of the portable information apparatus obtains the log information of the portable information apparatus by collecting operation logs from the one or more file processors.

5. The cooperative image processing system as recited in claim 1, wherein the log information obtaining portion of the portable information apparatus obtains a performance log proving that the file has been transferred to the any one of the one or more file processors, as the log information of the portable information apparatus.

6. The cooperative image processing system as recited in claim 1, wherein the log information obtaining portion of the portable information apparatus obtains the log information of the portable information apparatus when transferring the file to the any one of the one or more file processors; when receiving a request for the file from the any one of the one or more file processors; when the any one of the one or more file processors finishes its processing on the file; when a user performs a certain operation; or at regular time intervals.

7. A cooperative image processing system comprising an image processing apparatus and a portable information apparatus capable of connecting to each other physically or wirelessly, the image processing apparatus comprising:

a job execution portion that executes a job on a file in accordance with user instructions from the portable information apparatus; and a log information generator that generates log information of the image processing apparatus which includes a job history proving that the file has been subjected to job execution by the job execution portion, the portable information apparatus comprising:

a display;

one or more file processors that creates a target file for job execution;

a cooperation portion that shows on the display an operation screen through which to use functions of the image processing apparatus; receives the target file created by the one or more file processors; and transmits the target file to the image processing apparatus along with user instructions for job execution entered through the operation screen;

a log information obtaining portion that obtains: the log information of the image processing apparatus about the file, which is generated by the log information generator of the image processing apparatus; and log information of the portable information apparatus about the same file; and a log information manager that consolidates the log information of both the image processing apparatus and the portable information apparatus, which is obtained by the log information obtaining portion.

8. The cooperative image processing system as recited in claim 7, wherein the log information obtaining portion of the portable information apparatus obtains the log information of the image processing apparatus by transmitting a request for the log information to the image processing apparatus or simply by waiting to receive it from the image processing apparatus.

9. The cooperative image processing system as recited in claim 8, wherein the log information obtaining portion of the portable information apparatus transmits a request for the log information to the image processing apparatus when receiving a notice of the completion of job execution from the image processing apparatus after the job execution by the job execution portion; when a user performs a certain operation; or at regular time intervals.

10. The cooperative image processing system as recited in claim 7, wherein the log information obtaining portion of the portable information apparatus obtains the log information of the portable information apparatus by collecting operation logs from the one or more file processors.

11. The cooperative image processing system as recited in claim 7, wherein the log information obtaining portion of the portable information apparatus obtains a performance log proving that the file has been received from any one of the one or more file processors, as the log information of the portable information apparatus.

12. The cooperative image processing system as recited in claim 7, wherein the log information obtaining portion of the portable information apparatus obtains the log information of the portable information apparatus when receiving the file from any one of the one or more file processors; when a user performs a certain operation; or at regular time intervals.

13. The cooperative image processing system as recited in claim 1, wherein the portable information apparatus further comprises a display controller that allows the display to display a table of the log information of both the image processing apparatus and the portable information apparatus about the file, which is consolidated by the log information manager, in accordance with user instructions.

14. The cooperative image processing system as recited in claim 1, wherein:

the portable information apparatus further comprises a transmitter that transmits the log information of both the image processing apparatus and the portable information apparatus which is consolidated by the log information manager, to the image processing apparatus; and the image processing apparatus allows overwriting the log information of the image processing apparatus itself which is generated by the log information generator, with the log information of both the image processing apparatus and the portable information apparatus which is received from the portable information apparatus.

15. The cooperative image processing system as recited in claim 1, wherein:

the portable information application has a cooperation application and one or more general-purpose applications both of which are installed thereon and further comprises an application controller that enables the cooperation application and the one or more general-purpose applications; and the application controller enables the cooperation application, the log information obtaining portion, and the log information manager by activating the cooperation application and enables the one or more file processors by activating the one or more general-purpose applications.

16. A cooperative image processing method to be implemented by an cooperative image processing system comprising an image processing apparatus and a portable information apparatus capable of connecting to each other physically or wirelessly, the cooperative image processing method comprising:

the following steps of the image processing apparatus:

creating a file in accordance with user instructions from the portable information apparatus;

transmitting the created file to the portable information apparatus in accordance with user instructions from the portable information apparatus; and generating log information of the image processing apparatus which includes a transmission history proving that the file has been transmitted; and the following steps of the portable information apparatus:

performing processing on the created file;

showing on a display an operation screen through which to use functions of the image processing apparatus; transmitting user instructions for creating and transmitting the file, which are entered through the operation screen, to the image processing apparatus; receiving the created file in exchange for the user instructions; and transferring the file in response to a request so that the file can be subjected to processing;

obtaining: the log information of the image processing apparatus about the file, which is generated by the image processing apparatus; and log information of the portable information apparatus about the same file; and consolidating the log information of both the image processing apparatus and the portable information apparatus, which is obtained.

17. A cooperative image processing method to be implemented by an cooperative image processing system comprising an image processing apparatus and a portable information apparatus capable of connecting to each other physically or wirelessly, the cooperative image processing method comprising:

the following steps of the image processing apparatus:

executing a job on a file in accordance with user instructions from the portable information apparatus; and generating log information of the image processing apparatus which includes a job history proving that the file has been subjected to job execution; and the following steps of the portable information apparatus:

creating a target file for job execution;

showing on a display, an operation screen through which to use functions of the image processing apparatus; receiving the created target file; and transmitting the target file to the image processing apparatus along with user instructions for job execution entered through the operation screen;

obtaining: the log information of the image processing apparatus about the file, which is generated by the image processing apparatus; and log information of the portable information apparatus about the same file; and consolidating the log information of both the image processing apparatus and the portable information apparatus, which is obtained.

18. A portable information apparatus capable of connecting to an image processing apparatus physically or wirelessly, the portable information apparatus comprising:

a display;

one or more file processors that perform processing on a file created by the image processing apparatus;

a cooperation portion that shows on the display an operation screen through which to use functions of the image processing apparatus; transmits user instructions for creating and transmitting the file, which are entered through the operation screen, to the image processing apparatus; receives the file created by the image processing apparatus, in exchange for the user instructions; and transfers the file to any one of the one or more file processors in response to a request therefrom;

a log information obtaining portion that obtains: log information of the image processing apparatus which includes a transmission history proving that the file has been transferred; and log information of the portable information apparatus about the same file; and a log information manager that consolidates the log information of both the image processing apparatus and the portable information apparatus, which is obtained by the log information obtaining portion.

19. A portable information apparatus capable of connecting to an image processing apparatus physically or wirelessly, the portable information apparatus comprising:

a display;

one or more file processors that creates a target file for job execution;

a cooperation portion that shows on the display an operation screen through which to use functions of the image processing apparatus; receives the target file created by the one or more file processors; and transmits the target file to the image processing apparatus along with user instructions for job execution entered through the operation screen;

a log information obtaining portion that obtains: log information of the image processing apparatus which includes a job history proving that the file has been subjected to job execution; and log information of the portable information apparatus about the same file; and a log information manager that consolidates the log information of both the image processing apparatus and the portable information, apparatus which is obtained by the log information obtaining portion.

20. A non-transitory computer-readable recording medium storing a cooperative program for a portable information apparatus comprising:

a display; and one or more file processors that perform processing on a file created by and received from an image processing apparatus, the portable information apparatus being capable of connecting to the image processing apparatus physically or wirelessly, the non-transitory computer-readable recording medium making a computer of the portable information apparatus execute:

showing on the display an operation screen through which to use functions of the image processing apparatus;

transmitting user instructions for creating and transmitting the file, which are entered through the operation screen, to the image processing apparatus;

receiving the file created by the image processing apparatus, in exchange for the user instructions; and transferring the file to any one of the one or more the processors in response to a request therefrom;

obtaining log information of the image processing apparatus which includes a transmission history proving that the file has been transferred, and log information of the portable information apparatus about the same file; and consolidating the obtained log information of both the image processing apparatus and the portable information apparatus.

21. A non-transitory computer-readable recording medium storing a cooperative program for a portable information apparatus comprising:

a display; and one or more file processors that creates a target file for job execution, the portable information apparatus being capable of connecting to an image processing apparatus physically or wirelessly, the non-transitory computer-readable recording medium making a computer of the portable information apparatus execute:

showing on the display an operation screen through which to use functions of the image processing apparatus;

receiving the target file created by the one or more file processors;

transmitting the target file to the image processing apparatus along with user instructions for job execution entered through the operation screen;

obtaining log information of the image processing apparatus which includes a job history proving that the file has been subjected to job execution, and log information of the portable information apparatus about the same file; and consolidating the obtained log information of both the image processing apparatus and the portable information apparatus.

* * * * *